United States Patent
Han et al.

(10) Patent No.: US 11,846,587 B2
(45) Date of Patent: Dec. 19, 2023

(54) TOMOGRAPHIC IMAGING SYSTEM FOR TRANSPARENT MATERIAL COMPOSITE THIN FILM

(71) Applicants: Hyundai Motor Company, Seoul (KR); Kia Corporation, Seoul (KR); Yonsei University, University—Industry Foundation (UIF), Seoul (KR)

(72) Inventors: Jusung Han, Seoul (KR); Jiseok Hwang, Gyeonggi-do (KR); Se Joon Im, Gyeonggi-do (KR); Chulmin Joo, Gyeonggi-do (KR); Seungri Song, Seoul (KR); Baek Cheon Seong, Seoul (KR)

(73) Assignees: Hyundai Motor Company, Seoul (KR); Kia Corporation, Seoul (KR); Yonsei University, University-Industry Foundatoin (UIF), Seoul (KR)

( * ) Notice: Subject to any disclaimer, the term of this patent is extended or adjusted under 35 U.S.C. 154(b) by 71 days.

(21) Appl. No.: 17/669,823

(22) Filed: Feb. 11, 2022

(65) Prior Publication Data

US 2023/0003645 A1 Jan. 5, 2023

(30) Foreign Application Priority Data

Jul. 1, 2021 (KR) .................. 10-2021-0086585

(51) Int. Cl.
*G01B 9/02* (2022.01)
*G01N 21/47* (2006.01)
(Continued)

(52) U.S. Cl.
CPC ..... *G01N 21/4795* (2013.01); *G01B 9/02001* (2013.01); *G01B 9/02044* (2013.01); *G01B 9/02091* (2013.01)

(58) Field of Classification Search
CPC ............ G01N 21/4795; G01B 9/02001; G01B 9/02011; G01B 9/02012; G01B 9/02034;
(Continued)

(56) References Cited

U.S. PATENT DOCUMENTS 10,107,615 B2 * 10/2018 Kay ...................... G01B 11/007
2012/0176623 A1 * 7/2012 Lee .................... G01B 11/0675
356/503

(Continued)

FOREIGN PATENT DOCUMENTS

JP 6371418 B2 8/2018
JP 6628589 B2 1/2020
(Continued)

OTHER PUBLICATIONS

Shirazi MF, Park K, Wijesinghe RE, Jeong H, Han S, Kim P, Jeon M, Kim J. Fast Industrial Inspection of Optical Thin Film Using Optical Coherence Tomography. Sensors. 2016; 16(10):1598. https://doi.org/10.3390/s16101598 (Year: 2016).*
(Continued)

*Primary Examiner* — Uzma Alam
*Assistant Examiner* — Jonathon Cook
(74) *Attorney, Agent, or Firm* — Fox Rothschild LLP (57) ABSTRACT

A tomographic imaging system includes a light source, a light irradiation unit that irradiates light to a transparent material composite thin film sample and a reference mirror and acquires an interference signal between light reflected and scattered from the sample and light reflected from the reference mirror, a light measuring unit that measures the interference signal acquired by the light irradiation unit, a light transmission unit that transmits the light output from the light source to the light irradiation unit and transmits the interference signal of the light transmitted from the light irradiation unit to the light measuring unit; and a signal
(Continued)

processing apparatus that converts the interference signal of the sample, outputs the converted interference signal as a tomographic image, and monitors the interference signal acquired by the light irradiation unit to modulate intensity and a polarization state of the light input to the light irradiation unit.

18 Claims, 6 Drawing Sheets

(51) Int. Cl.
　　　*G01B 9/02091*　　(2022.01)
　　　*G01B 9/02001*　　(2022.01)
(58) Field of Classification Search
　　　CPC ............ G01B 9/02044; G01B 9/02067; G01B 9/02091; G01B 2290/70
　　　See application file for complete search history.

(56) References Cited

U.S. PATENT DOCUMENTS

2014/0023255 A1* 1/2014 Lim .................. G01B 9/02091
　　　　　　　　　　　　　　　　　　　　　　　　382/131
2017/0059300 A1* 3/2017 Osawa ............... G01B 9/02091
2018/0143147 A1* 5/2018 Milner ................ G01N 23/203
2021/0149337 A1* 5/2021 Wei .................... G01N 15/1434

FOREIGN PATENT DOCUMENTS

| KR | 10-0658493 B1 | 12/2006 |
| KR | 10-1053222 B1 | 8/2011 |
| KR | 10-1179759 B1 | 9/2012 |
| KR | 10-1426550 B1 | 8/2014 |
| KR | 10-2101875 B1 | 4/2020 |
| KR | 10-2021-0157969 A | 12/2021 |
| KR | 10-2022-0003217 A | 1/2022 |

OTHER PUBLICATIONS

Kamińska AM, Strąkowski MR, Pluciński J. Spectroscopic Optical Coherence Tomography for Thin Layer and Foil Measurements. Sensors. 2020; 20(19):5653. https://doi.org/10.3390/s20195653 (Year: 2020).*

Baumann B. Polarization Sensitive Optical Coherence Tomography: A Review of Technology and Applications. Applied Sciences. 2017; 7(5):474. https://doi.org/10.3390/app7050474 (Year: 2017).*

* cited by examiner

TOMOGRAPHIC IMAGING SYSTEM FOR TRANSPARENT MATERIAL COMPOSITE THIN FILM

CROSS-REFERENCE TO RELATED APPLICATION

This application claims under 35 U.S.C. § 119 the benefit of Korean Patent Application No. 10-2021-0086585 filed in the Korean Intellectual Property Office on Jul. 1, 2021, the entire contents of which are incorporated herein by reference.

BACKGROUND

(a) Technical Field

The present disclosure relates to a tomographic imaging system for a transparent material composite thin film, more particularly, to the tomographic imaging system capable of improving quality of a tomographic image by reducing a surface reflection signal of the transparent material composite thin film and increasing a focal depth.

(b) Description of the Related Art

Optical coherence tomography (OCT), a type of optical three-dimensional image technology, is an imaging technology that non-destructively acquires a tomographic structure image of a specimen with high resolution using an interferometer of non-coherent light. Typically, OCT forms a focus inside a sample to be analyzed using a lens, and acquires reflection/scattering signals before and after a focal plane to obtain a tomographic image.

In order to precisely analyze a tomographic structure of a specimen, it is important to acquire high-resolution images across all image depths. However, when a lens is typically used, a section forming a focus is very short, resulting in a difference in image quality for each image depth. In particular, in an actual use environment, a height may be different every time the specimen is positioned, and when applied to an automated system accompanying a stage, a difference in a specimen height due to vibrations may additionally occur, and therefore, it is important to maintain the image level according to the depth direction position of the sample.

In addition, since the thin film specimen has a flat surface, a reflected signal at a surface boundary is very large compared to the signal scattered inside the thin film when acquiring the OCT image, which may exceed a dynamic range of a photodetector, so a surface state and an internal structure of the specimen are difficult to analyze simultaneously.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a tomographic imaging system for a transparent material composite thin film having advantages of improving quality of a tomographic image by reducing a surface reflection signal of the transparent material composite thin film and increasing a focal depth when acquiring an optical coherence tomography (OCT) image.

An exemplary embodiment of the present disclosure provides a tomographic imaging system for a transparent material composite thin film including: a light source, a light irradiation unit that irradiates light from the light source to a transparent material composite thin film sample and a reference mirror and acquires an interference signal between light reflected and scattered from the sample and light reflected from the reference mirror; a light measuring unit that measures the interference signal acquired by the light irradiation unit; a light transmission unit that transmits the light output from the light source to the light irradiation unit and transmits the interference signal of the light transmitted from the light irradiation unit to the light measuring unit; and a signal processing apparatus that controls to convert the interference signal of the sample detected by the light measuring unit, output the converted interference signal as a tomographic image, and monitor the interference signal acquired by the light irradiation unit to modulate intensity and a polarization state of the light input to the light irradiation unit.

The light source may include a sweep source laser, a supercontinuum laser, or a super luminescent diode.

The light transmission unit may include a wave guide including an optical fiber. The light irradiation unit may include a sample lens that irradiates the light transmitted from the light source to the transparent material composite thin film sample; and a reference lens that irradiates the light transmitted from the light source to the reference mirror.

The light irradiation unit may further include: a collimator that straightens the light transmitted to the light irradiation unit; an adaptive illuminance controller that modulates the intensity and polarization state of the light input to the light irradiation unit; a pattern mask that extends a focal depth of the irradiated light by manipulating the intensity, a phase, and a path of the light input to the light irradiation unit for each spatial region; and a beam scanner that is disposed in front of the sample lens, and reflects and scans the light passing through the pattern mask toward the sample lens.

The pattern mask may be reflective or transmissive, or reflective and transmissive.

The pattern mask may transmit and reflect the light irradiated by the light irradiation unit to irradiate the transmitted light to the sample lens and irradiate the reflected light to the reference lens.

The pattern mask may include any one of a phase mask, an amplitude mask, a mirror, or a spatial light modulator.

The adaptive illuminance controller may include an optical semiconductor of any one of a spatial light modulator, an electro-optic modulator, an acousto-optic modulator, a variable retarder, or a digital mirror device.

The adaptive illumination controller may be disposed between the collimator and the pattern mask.

The adaptive illuminance controller may be disposed between the beam scanner and the sample lens.

The light irradiation unit may include two adaptive illuminance controllers, and one of the plurality of adaptive illuminance controllers may be disposed between the beam scanner and the sample lens, and another of the plurality of adaptive illuminance controllers may be disposed between the pattern mask and the reference lens.

The light irradiation unit may further include: a beam splitter that is disposed at a rear end of the collimator to split the light transmitted to the light irradiation unit so that the transmitted light is irradiated to the sample lens and the reflected light is irradiated to the reference lens; a first adaptive illuminance controller that is disposed at the rear end of the light splitter to irradiate the light transmitted from the light splitter; and a second adaptive illuminance controller that is disposed at the rear end of the light splitter to irradiate the light reflected from the light splitter.

The first pattern mask and the beam scanner may be sequentially disposed between the sample lens and the first adaptive illuminance controller, and a second pattern mask may be disposed between the reference lens and the second adaptive illuminance controller.

The light irradiation unit may receive the light from the light transmission unit formed of bifurcated optical fibers, respectively, and irradiate the light to the sample lens and the reference lens.

The light irradiation unit may include: a first collimator that straightens a first branch of light transmitted from the light transmission unit toward the sample lens; a second collimator that straightens the second branch of light transmitted from the light transmission unit toward the reference lens; a third adaptive illuminance controller that is disposed at the rear end of the first collimator and irradiated with the first branch of light transmitted from the light transmission unit; and a fourth adaptive illuminance controller that is disposed at the rear end of the second collimator and irradiated with the second branch of light transmitted from the light transmission unit.

A third pattern mask and a beam scanner may be sequentially disposed between the sample lens and the third adaptive illuminance controller, and a fourth pattern mask may be disposed between the reference lens and the fourth adaptive illuminance controller.

The light measuring unit may include: a light splitter that transmits the light irradiated from the light source to the light irradiation unit and reflects interference light induced by the light irradiation unit; a spectrometer that receives the interference light reflected from the light splitter; and a photodetector that detects the light transmitted from the spectrometer, and the spectrometer may include a plurality of lenses and an image sensor sensing a shape of light transmitted from the plurality of lenses.

Between the plurality of lenses and the image sensor may be provided a diffraction grating plate that diffracts the light transmitted from the plurality of lenses and converts the diffracted light into a plurality of lines, and a lens that transmits the light converted from the diffraction grating plate to the image sensor.

Between the light source and the light measuring unit may be further provided an optical filter that limits a bandwidth of a wavelength of the light irradiated from the light source.

According to the tomographic imaging system for a transparent material composite thin film according to an exemplary embodiment of the present disclosure, it is possible to improve the quality of the tomographic image by reducing the surface reflection signal of the transparent material composite thin film and increasing the focal depth.

DETAILED DESCRIPTION OF THE EXEMPLARY EMBODIMENTS

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein.

In addition, in several exemplary embodiments, components having the same configuration will be representatively described using the same reference numerals in an exemplary embodiment, and only components different from those of an exemplary embodiment will be described in the other exemplary embodiments.

Note that drawings are schematic and not drawn to scale. The relative dimensions and ratios of parts in the drawing are shown exaggerated or reduced in size for clarity and convenience in the drawing, and any dimensions are illustrative only and not limiting. In addition, the same reference sign is used to indicate similar features to the same structure, element or part appearing in the drawing of two or more. When a part is referred to as being "on" or "on" another part, it may be directly on top of the other part, or may be accompanied by the other part in between.

An exemplary embodiment of the present disclosure specifically represents an exemplary embodiment of the present disclosure. As a result, numerous variations of the illustration are expected. Accordingly, the exemplary embodiment is not limited to a specific form of the illustrated area, and includes, for example, a deformation of the form by manufacturing.

Hereinafter, it will be described in detail with respect to a structure of a tomography imaging system for a transparent material composite thin film according to an exemplary embodiment of the present disclosure.

Figure 1:
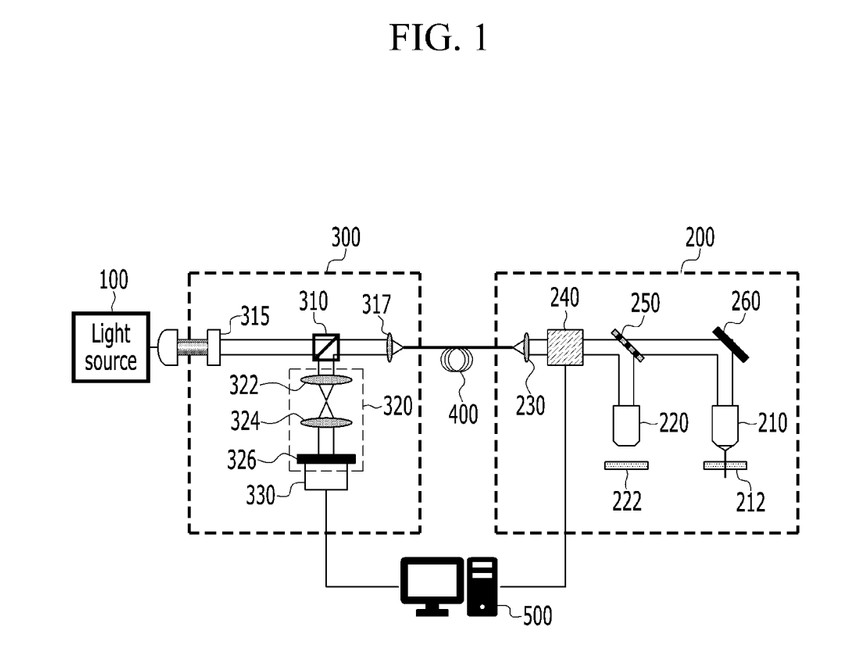
FIG. 1 is a diagram schematically illustrating a tomography imaging system for a transparent material composite thin film according to an exemplary embodiment of the present disclosure.

FIG. 1 is a diagram schematically illustrating a tomography imaging system for a transparent material composite thin film according to an exemplary embodiment of the present disclosure.

Referring to FIG. 1, according to an exemplary embodiment of the present disclosure, a tomography imaging system for a transparent material composite thin film includes a light source 100, a light irradiation unit 200, a light measuring unit 300, a light transmission unit 400, and a signal processing apparatus 500.

The light source 100 may include a sweep source laser, a supercontinuum laser, or a super luminescent diode.

The light output from the light source 100 may be input to the light measuring unit 300 through a single mode fiber. An optical filter 315 that limits a bandwidth of a wavelength of the light irradiated from the light source 100 may be further provided between the light source 100 and the light measuring unit 300.

The light output from the light source 100 passes through the light measuring unit 300 and is irradiated to the light irradiation unit 200 through the light transmission unit 400. The light irradiation unit 200 includes a collimator 230, an adaptive illumination controller (AIC) 240, a pattern mask 250, a beam scanner 260, a sample lens 210, and a reference lens 220.

The collimator 230 makes the light transmitted to the light irradiation unit 200 straighten in the light irradiation unit 200. The adaptive illuminance controller 240 may be disposed at a rear end of the collimator 230, and modulates intensity and a polarization state of light input to the light irradiation unit 200. The light modulated in the adaptive illuminance controller 240 is partially transmitted and partially reflected in the pattern mask 250. The light transmitted from the pattern mask 250 is transmitted to the sample lens 210, and the reflected light is transmitted to the reference lens 220. The transmitted light is irradiated to the sample 212 and the reference mirror 222 through the sample lens 210 and the reference lens 220, respectively.

The pattern mask 250 serves to extend a focal depth of the irradiated light by manipulating the intensity, a phase, and a path of the light input to the light irradiation 200 unit for each spatial region. The pattern mask 250 may be reflective or transmissive, or reflective and transmissive. In addition, the pattern mask 250 may be designed to cross a transmission surface and a reflection surface, and may be positioned at the front end of the sample lens 210 and the reference lens 220 to extend the focal depth.

The pattern mask 250 may include any one of a phase mask, an amplitude mask, a mirror, or a spatial light modulator.

It is possible to uniformly irradiate light energy in a depth direction of the sample 212 as much as the depth extended through the pattern mask 250 and to maintain uniform image quality over a wide depth region. As the light incident on the pattern mask 250 passes through the pattern mask 250, a wavefront is modified, and the light distribution and phase are redistributed in a region near the focal depth, so an extended focus may be realized.

The adaptive illuminance controller 240 may include an optical semiconductor of any one of a spatial light modulator, an electro-optic modulator, an acousto-optic modulator, a variable retarder, or a digital mirror device.

The adaptive illuminance controller 240 may reduce the surface reflection of the sample 212 by deriving and applying an optimally irradiated light condition based on the real-time surface reflection signal measured while changing the irradiated light, thereby effectively imaging the internal structure of the sample 212. The adaptive illuminance controller 240 may be configured of an optical system that includes a polarizing plate capable of modulating the polarization state of the light source 100, a polarization optical system such as a wavelength plate, a spatial light modulator, and the like.

The adaptive illuminance controller 240 may be disposed between the collimator 230 and the pattern mask 250, and may be connected to the signal processing apparatus 500 to derive and apply the optimally irradiated light conditions based on the surface reflection signals of the sample 212 and the reference mirror 222. In addition, the adaptive illuminance controller 240 may derive an appropriately irradiated light condition for reducing surface reflection by acquiring a surface reflection signal of a local area over a short time before scanning a specimen by the beam scanner 260. Through this, it is possible to clearly visualize the inside of the tomography of the sample 212 whose image is difficult to be processed due to the surface reflection, without additional image processing.

The light transmitted from the pattern mask 250 is transmitted to the sample lens 210 through the beam scanner 260. The beam scanner 260 is disposed at a front end of the sample lens 210, reflects the light transmitted from the pattern mask 250 toward the sample lens 210, and scans the sample 212. The sample lens 210 irradiates light to the sample 212, receives the reflected and scattered light from the sample 212 again, and transmits the received light back to a reverse direction of a path to which light is irradiated and to the adaptive illuminance controller 240 and the light measuring unit 300.

In addition, the light reflected from the pattern mask 250 is transmitted to the reference lens 220, and the reference lens 220 irradiates the light to the reference mirror 222. The reference lens 220 receives the light reflected from the reference mirror 222 again, transmits the received light back to the reverse direction of the path to which light is irradiated, and to the adaptive illuminance controller 240 and the light measuring unit 300.

The reference mirror 222 has a very smooth surface, and the polarization state of the light reflected from the reference mirror 222 is maintained. However, the polarization state of the light reflected and scattered from the sample 212 is changed. A polarization difference between the reflected light transmitted in the reverse direction from the reference lens 220 and the reflected and scattered light transmitted in the reverse direction from the sample lens 210 may be appropriately controlled by the adaptive illuminance controller 240. For example, when the polarization difference between the light transmitted from the sample lens 210 and the reference lens 220 is controlled to be 90°, control is made so that, due to the nature of light interfering with only the same polarization component, the light reflected from the sample 212 and the light reflected from the reference mirror 222 hardly interfere vertically with each other, and only the scattered light whose polarization has changed inside the sample 212 interferes, so the surface reflection may be reduced.

The light transmission unit 400 transmits the light output from the light source 100 to the light irradiation unit 200, and transmits the interference signal of the light reflected and scattered from the reference mirror 222 and the sample 212 to the light measuring unit 300, and the light measuring unit 300 measures an interference signal of light acquired from the light irradiation unit 200.

The light measuring unit 300 includes a light splitter 310, a spectrometer 320, and a photodetector 330. The light splitter 310 transmits the light irradiated from the light source 100 to the light irradiation unit 200, and reflects the interference light induced by the light irradiation unit 200 and transmits the reflected interference light to the spectrometer 320.

The spectrometer 320 receives the interference light reflected from the light splitter 310, and the interference light transmitted from the spectrometer 320 is detected by the photodetector 330 and transmitted to the signal processing apparatus 500. The signal processing apparatus 500 converts the interference signal of the sample 212 detected by the photodetector 330 and outputs the converted interference signal as a tomographic image.

Meanwhile, the spectrometer may include a plurality of lenses 322 and 324 and an image sensor 326 that senses a shape of light transmitted from the plurality of lenses 322 and 324. The plurality of lenses 322 and 324 may be convex lenses arranged side by side.

The signal detected by the photodetector 330 may be demodulated into the intensity of light for each wavelength, and may be converted from wavelength-domain data to depth-domain data. The signal processing may be performed on raw data through background substrate, k-linearization, or Fourier transform, and other various signal processing methods are used to convert the raw data from the wavelength-domain data to the depth-domain data.

In this case, the signal processing is performed in real time, and the image quality of the sample 212 may be estimated from the tomographic image subjected to the signal processing in real time. For example, it is possible to implement a conversion into an image figure of merit such as histogram entropy and image contrast, and the adaptive illuminance controller 240 may receive the image figure of merit in real time to modulate the polarization state and amount of light.

Figure 2:
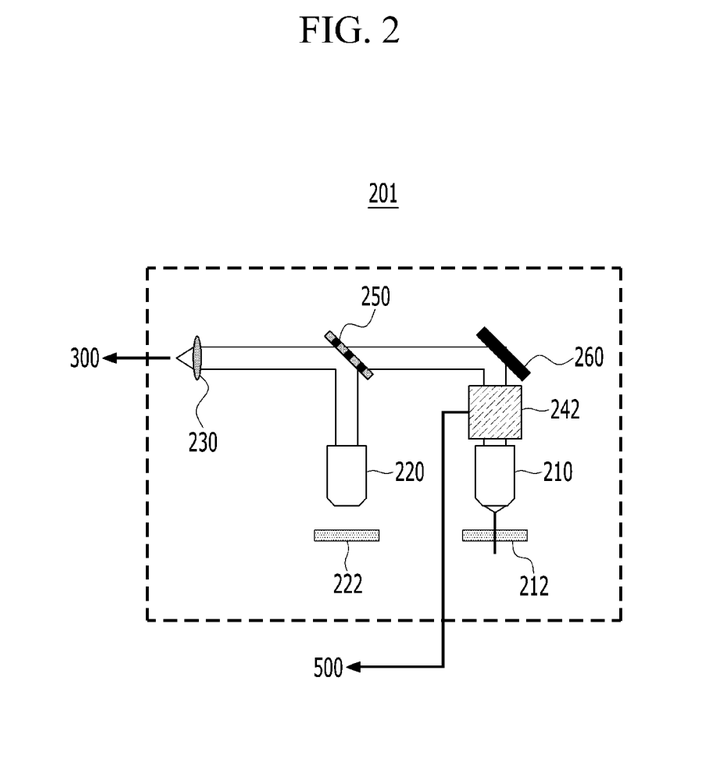
FIG. 2 is a diagram schematically illustrating another embodiment of a light irradiation unit of a tomographic imaging system for a transparent material composite thin film according to an exemplary embodiment of the present disclosure.

FIG. 2 is a diagram schematically illustrating another embodiment of the light irradiation unit of the tomographic imaging system for a transparent material composite thin film according to an exemplary embodiment of the present disclosure.

Referring to the light irradiation unit 201 illustrated in FIG. 2, the adaptive illuminance controller 242 may be disposed between the beam scanner 260 and the sample lens 210. A portion of the light straightened through the collimator 230 in the light irradiation unit 201 is transmitted through the pattern mask 250, and the transmitted light passes through the beam scanner 260 and the adaptive illuminance controller 242 and is transmitted to the sample lens 210. In addition, some light reflected from the pattern mask 250 is transmitted to the reference lens 220.

The light reflected and scattered from the sample 212 is transmitted to the adaptive illuminance controller 242 through the sample lens 210, and the adaptive illuminance controller 242 transmits the surface reflection and scattering signals to the signal processing apparatus 500, and the polarization state and the amount of light may be modulated by deriving a condition of the light transmitted to the light irradiation unit 201 based on the light reflected and scattered.

Figure 3:
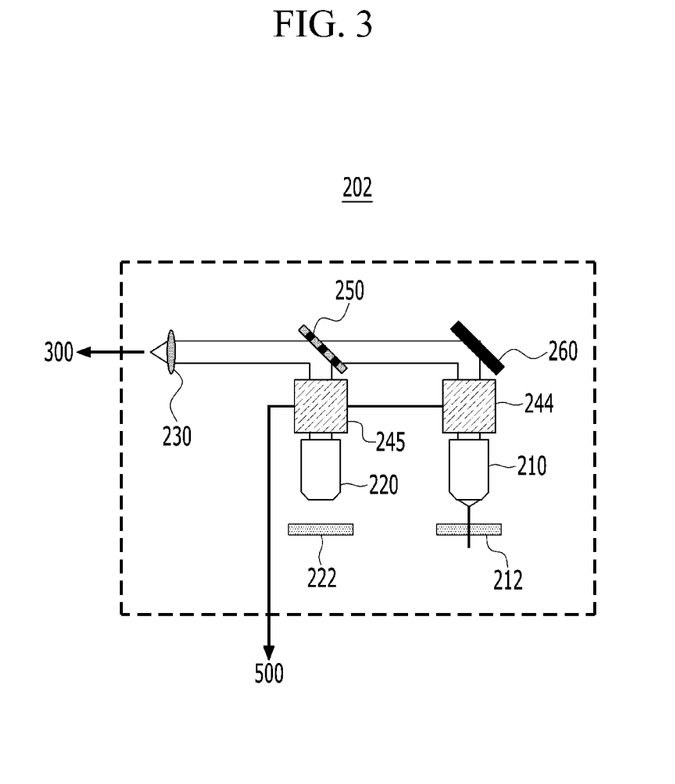
FIG. 3 is a diagram schematically illustrating another embodiment of a light irradiation unit of a tomographic imaging system for a transparent material composite thin film according to an exemplary embodiment of the present disclosure.

FIG. 3 is a diagram schematically illustrating still another embodiment of a light irradiation unit of a tomographic imaging system for a transparent material composite thin film according to an exemplary embodiment of the present disclosure.

The light irradiation unit 202 illustrated in FIG. 3 includes two adaptive illuminance controllers 244 and 245, and one of the plurality of adaptive illuminance controllers 244 may be disposed between a beam scanner 260 and a sample lens 210, and the another (of the plurality of adaptive illuminance controllers) 245 may be disposed between the pattern mask 250 and the reference lens 220. The two adaptive illuminance controllers 244 and 245 may acquire surface reflection and scattering signals from the sample lens 210 and the reference lens 220, respectively, and transmit the acquired surface reflection and scattering signals to the signal processing apparatus 500, and based on the obtained surface reflection and scattering signals, may derive the light transmitted to the light irradiation unit 202 to modulate the polarization state and amount of light the light irradiation unit 202.

Figure 4:
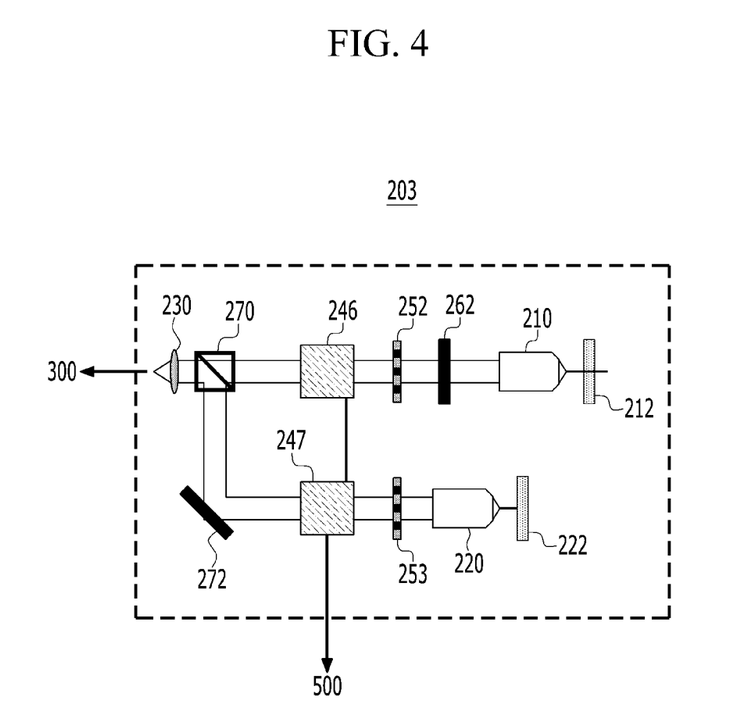
FIG. 4 is a diagram schematically illustrating still another embodiment of a light irradiation unit of a tomographic imaging system for a transparent material composite thin film according to an exemplary embodiment of the present disclosure.

FIG. 4 is a diagram schematically illustrating further still another embodiment of a light irradiation unit of a tomographic imaging system for a transparent material composite thin film according to an exemplary embodiment of the present disclosure.

In the light irradiation unit 203 illustrated in FIG. 4, a light splitter 270 may be disposed at a rear end of the collimator 230. The light transmitted to the light irradiation unit 203 is transmitted to the light splitter 270 through the collimator 230, and the light splitter 270 splits the light so that the transmitted light is irradiated toward the sample lens 210 and the reflected light is irradiated to the reference lens 220.

A first adaptive illuminance controller 246 to which the light transmitted from the light splitter 270 is irradiated may be disposed at a rear end of the light splitter 270, and a first pattern mask 252 and a beam scanner 262 may be sequentially disposed at a rear end of the first adaptive illuminance controller 246.

In addition, a second adaptive illuminance controller 247 to which the light reflected from the light splitter 270 is irradiated may be disposed at the rear end of the light splitter 270, and a second pattern mask 253 may be disposed at a rear end of the second adaptive illuminance controller 247. Meanwhile, a reflection mirror 272 may be installed between the light splitter 270 and the second adaptive illuminance controller 247.

The two adaptive illuminance controllers 246 and 247 may acquire surface reflection and scattering signals from the sample lens 210 and the reference lens 220, respectively, and transmit the acquired surface reflection and scattering signals to the signal processing apparatus 500, and based on the obtained surface reflection and scattering signals, may derive the light transmitted to the light irradiation unit 203 to modulate the polarization state and amount of light the light irradiation unit 203.

Figure 5:
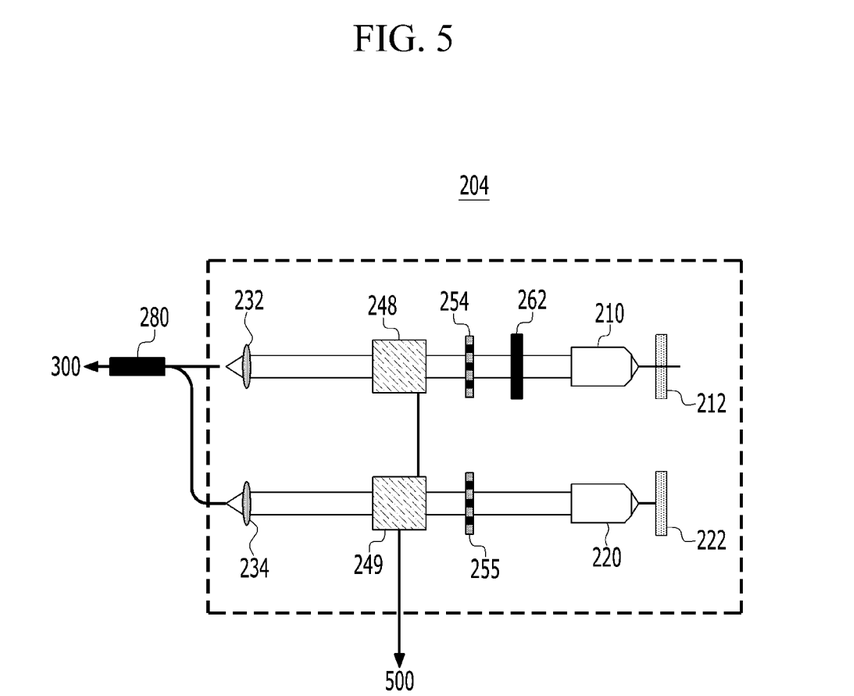
FIG. 5 is a diagram schematically illustrating further still another embodiment of a light irradiation unit of a tomographic imaging system for a transparent material composite thin film according to an exemplary embodiment of the present disclosure.

FIG. 5 is a diagram schematically illustrating further still another embodiment of a light irradiation unit of a tomographic imaging system for a transparent material composite thin film according to an exemplary embodiment of the present disclosure.

The light irradiation unit 204 illustrated in FIG. 5 may have a structure which receives light from the light transmission unit 280 formed of bifurcated optical fibers, respectively, and transmits the light along each light path to the sample lens 210 and the reference lens 220, respectively.

The light irradiation unit 204 may include a first collimator 232 that straightens a first branch of light transmitted from the light transmission unit 280 toward the sample lens 210, and a second collimator 234 that straightens the second branch of light transmitted from the light transmission unit 280 toward the reference lens 220.

In addition, the light irradiation unit 204 may include a third adaptive illuminance controller 248 that is disposed at the rear end of the first collimator 232 and irradiated with a first branch of light transmitted from the light transmission unit 280, and a fourth adaptive illuminance controller 249 that is disposed at the rear end of the second collimator 234 and irradiated with a second branch of light transmitted from the light transmitting unit 280.

A third pattern mask 254 and a beam scanner 262 may be sequentially disposed at the rear end of the third adaptive illuminance controller 248, and a fourth pattern mask 255 may be disposed at the rear end of the fourth adaptive illuminance controller 249.

The two adaptive illuminance controllers 248 and 249 may acquire surface reflection and scattering signals from the sample lens 210 and the reference lens 220, respectively, and transmit the acquired surface reflection and scattering signals to the signal processing apparatus 500, and based on the obtained surface reflection and scattering signals, may derive the light transmitted to the light irradiation unit 204 to modulate the polarization state and amount of light the light irradiation unit 204.

Figure 6:
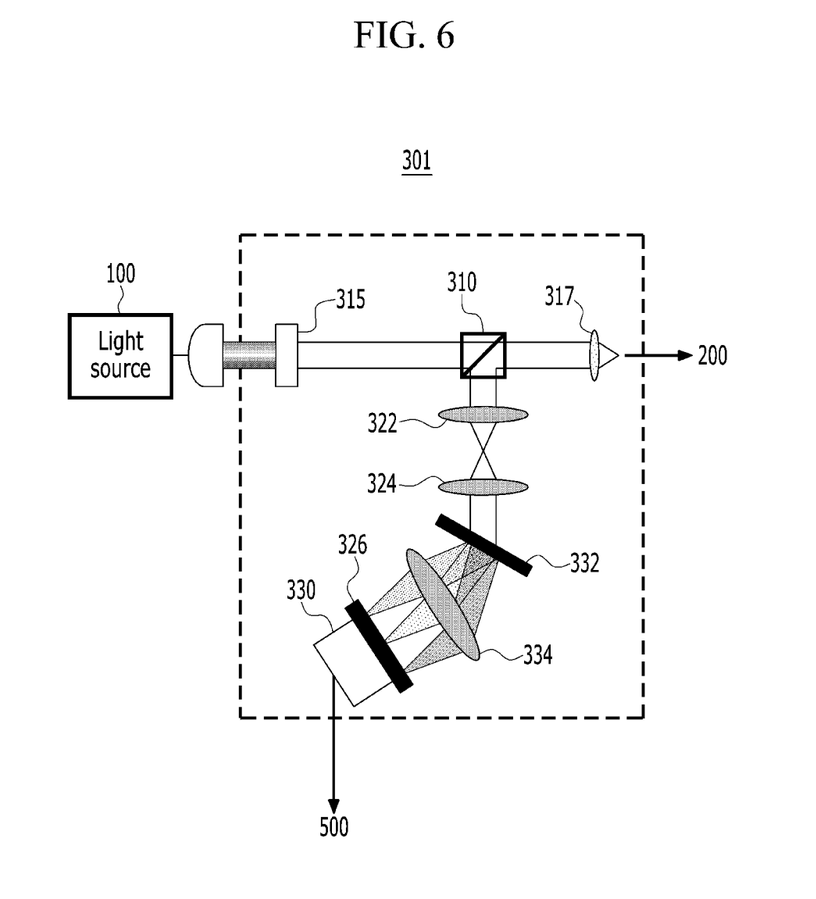
FIG. 6 is a diagram schematically illustrating another embodiment of a light measuring unit of a tomographic imaging system for a transparent material composite thin film according to an exemplary embodiment of the present disclosure.

FIG. 6 is a diagram schematically illustrating another embodiment of a light measuring unit of a tomographic imaging system for a transparent material composite thin film according to an exemplary embodiment of the present disclosure.

In the light measuring unit 301 illustrated in FIG. 6, a diffraction grating plate 332 that diffracts light transmitted from a plurality of lenses 322 and 324 and converts the diffracted light into a plurality of lines and a lens 334 that transmits the light converted from the diffraction grating plate 332 to the image sensor 326 may be provided between the plurality of lenses 322 and 324 and the image sensor 326.

The signal detected by the photodetector 330 may be converted from wavelength-domain data to depth-domain data in real time and output as a tomographic image in the signal processing apparatus 500.

As described above, according to the tomographic imaging system for a transparent material composite thin film according to an exemplary embodiment of the present disclosure, it is possible to improve the quality of the tomographic image by reducing the surface reflection signal of the transparent material composite thin film and increasing the focal depth.

While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

What is claimed is:

1. A tomographic imaging system for a transparent material composite thin film, the tomographic imaging system comprising:
a light source;
a light irradiation unit that irradiates light from the light source to a transparent material composite thin film sample and a reference mirror and acquires an interference signal between light reflected and scattered from the sample and light reflected from the reference mirror;
a light measuring unit that measures the interference signal acquired by the light irradiation unit;
a light transmission unit that transmits the light output from the light source to the light irradiation unit and transmits the interference signal of the light transmitted from the light irradiation unit to the light measuring unit; and
a signal processing apparatus that controls to convert the interference signal of the sample detected by the light measuring unit, output the converted interference signal as a tomographic image, and monitor the interference signal acquired by the light irradiation unit to modulate intensity and a polarization state of the light input to the light irradiation unit,
wherein the light irradiation unit includes:
a sample lens that irradiates the light transmitted from the light source to the transparent material composite thin film sample;
a reference lens that irradiates the light transmitted from the light source to the reference mirror;
a collimator that straightens the light transmitted to the light irradiation unit;
an adaptive illuminance controller that modulates the intensity and polarization state of the light input to the light irradiation unit;
a pattern mask that extends a focal depth of the irradiated light by manipulating the intensity, a phase, and a path of the light input to the light irradiation unit for each spatial region; and
a beam scanner that is disposed in front of the sample lens, and reflects and scans the light passing through the pattern mask toward the sample lens.

2. The tomographic imaging system of claim 1, wherein the light source includes a sweep source laser, a supercontinuum laser, or a super luminescent diode.

3. The tomographic imaging system of claim 1, wherein the light transmission unit includes a wave guide including an optical fiber.

4. The tomographic imaging system of claim 1, wherein the pattern mask is reflective or transmissive, or reflective and transmissive.

5. The tomographic imaging system of claim 1, wherein the pattern mask transmits and reflects the light irradiated by the light irradiation unit to irradiate the transmitted light to the sample lens and irradiate the reflected light to the reference lens.

6. The tomographic imaging system of claim 1, wherein the pattern mask includes any one of a phase mask, an amplitude mask, a mirror, or a spatial light modulator.

7. The tomographic imaging system of claim 1, wherein the adaptive illuminance controller includes an optical semiconductor of any one of a spatial light modulator, an electro-optic modulator, an acousto-optic modulator, a variable retarder, or a digital mirror device.

8. The tomographic imaging system of claim 1, wherein the adaptive illumination controller is disposed between the collimator and the pattern mask.

9. The tomographic imaging system of claim 1, wherein the adaptive illuminance controller is disposed between the beam scanner and the sample lens.

10. The tomographic imaging system of claim 1, wherein:
the light irradiation unit includes two adaptive illuminance controllers, and
one of the plurality of adaptive illuminance controllers is disposed between the beam scanner and the sample lens, and another of the plurality of adaptive illuminance controllers is disposed between the pattern mask and the reference lens.

11. The tomographic imaging system of claim 1, wherein the light irradiation unit further includes:
a beam splitter that is disposed at a rear end of the collimator to split the light transmitted to the light irradiation unit so that the transmitted light is irradiated to the sample lens and the reflected light is irradiated to the reference lens;
a first adaptive illuminance controller that is disposed at the rear end of the light splitter to irradiate the light transmitted from the light splitter; and
a second adaptive illuminance controller that is disposed at the rear end of the light splitter to irradiate the light reflected from the light splitter.

12. The tomographic imaging system of claim 11, wherein:
the first pattern mask and the beam scanner are sequentially disposed between the sample lens and the first adaptive illuminance controller, and
a second pattern mask is disposed between the reference lens and the second adaptive illuminance controller.

13. The tomographic imaging system of claim 1, wherein the light irradiation unit receives the light from the light transmission unit formed of bifurcated optical fibers, respectively, and irradiates the light to the sample lens and the reference lens.

14. The tomographic imaging system of claim 13, wherein the light irradiation unit includes:
a first collimator that straightens a first branch of light transmitted from the light transmission unit toward the sample lens;
a second collimator that straightens a second branch of light transmitted from the light transmission unit toward the reference lens;
a third adaptive illuminance controller that is disposed at the rear end of the first collimator and irradiated with the first branch of light transmitted from the light transmission unit; and
a fourth adaptive illuminance controller that is disposed at the rear end of the second collimator and irradiated with the second branch of light transmitted from the light transmission unit.

15. The tomographic imaging system of claim 14, wherein:
a third pattern mask and a beam scanner are sequentially disposed between the sample lens and the third adaptive illuminance controller, and
a fourth pattern mask is disposed between the reference lens and the fourth adaptive illuminance controller.

16. The tomographic imaging system of claim 1, wherein the light measuring unit includes:
a light splitter that transmits the light irradiated from the light source to the light irradiation unit and reflects interference light induced by the light irradiation unit;
a spectrometer that receives the interference light reflected from the light splitter; and
a photodetector that detects the light transmitted from the spectrometer, and
the spectrometer includes a plurality of lenses and an image sensor sensing a shape of light transmitted from the plurality of lenses.

17. The tomographic imaging system of claim 16, wherein, between the plurality of lenses and the image sensor, are provided:
a diffraction grating plate that diffracts the light transmitted from the plurality of lenses and converts the diffracted light into a plurality of lines; and
a lens that transmits the light converted from the diffraction grating plate to the image sensor.

18. The tomographic imaging system of claim 1, wherein, between the light source and the light measuring unit, is further provided an optical filter that limits a bandwidth of a wavelength of the light irradiated from the light source.

* * * * *